(12) United States Patent
Merchant

(10) Patent No.: US 11,370,354 B1
(45) Date of Patent: Jun. 28, 2022

(54) SCHOOL BUS HAVING A PEDESTRIAN LIGHTING SYSTEM

(71) Applicant: International Truck Intellectual Property Company, LLC, Lisle, IL (US)

(72) Inventor: Fozia Merchant, Schaumburg, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/499,224

(22) Filed: Oct. 12, 2021

(51) Int. Cl.
*B60Q 1/32* (2006.01)
*F21V 23/04* (2006.01)

(52) U.S. Cl.
CPC .............. *B60Q 1/323* (2013.01); *F21V 23/04* (2013.01); *B60Q 2400/40* (2013.01)

(58) Field of Classification Search
CPC ... B60Q 1/00; B60Q 1/26; B60Q 1/32; B60Q 1/323; B60Q 3/217; B60Q 3/41–47; B60Q 3/24–40; F21V 23/04
See application file for complete search history.

(56) References Cited

U.S. PATENT DOCUMENTS

| | | | | |
|---|---|---|---|---|
| 5,493,269 A * | 2/1996 | Durley | ............... | B60Q 1/50 340/901 |
| 5,874,989 A * | 2/1999 | O'Brien | ............... | H04N 7/183 348/148 |
| 8,182,125 B2 * | 5/2012 | Englander | ............ | B60Q 1/2692 362/478 |
| 8,698,610 B2 * | 4/2014 | Krugh, IV | ............... | B60Q 1/50 340/471 |

* cited by examiner

*Primary Examiner* — Jason M Han
(74) *Attorney, Agent, or Firm* — Mark C. Bach

(57) ABSTRACT

A school bus having a pedestrian lighting system includes bus entrance door lamps that illuminate an area adjacent to the entrance door of the bus. Switch logic circuitry is connected to and controls bus door entrance lamp circuitry that provides power to the bus entrance door lamps. A power cutoff noise suppression switch, which otherwise functions to turn off noise generating devices in the bus when stopping for a railroad crossing, is connected to the switch logic circuitry or to delayed deactivation timer circuitry. The power cutoff noise suppression switch and the switch logic circuitry or the delayed deactivation timer circuitry are configured so that input of the switch logic circuitry to the bus door entrance lamp circuitry is overridden, and the at least one bus entrance door lamp is turned off, when the power cutoff noise suppression switch is activated.

4 Claims, 12 Drawing Sheets

SCHOOL BUS HAVING A PEDESTRIAN LIGHTING SYSTEM

BACKGROUND

This disclosure relates to Bus Entrance Door lights that primarily function to illuminate the outside surface area located by the entrance door of a school bus, from above the driver's side window, along the side of the bus, and from above the bus entrance door, and the control thereof when opened, e.g., when stopping at railroad crossings.

RELATED ART

School districts normally provide school bus transportation. School buses are used to transport children to and from the school on a daily basis, typically five days per week. A majority of school buses' regular transit includes local routes for picking up and dropping off children living in rural, remote, and suburban neighborhoods. School schedules often dictate that buses begin transporting children and sometimes adults from as early as before dawn to as late as after dusk. Available natural daylight is reduced significantly when daylight savings time takes effect, such that the balance between daylight and after dark hours is impacted. Bus manufacturers' data reveal that demand for school buses is likely to continue to grow. Along with newer advanced technology integrated into school buses, some schools may increasingly draw students from long distances across cities. Similarly, bus drivers may drive for much longer hours in rural areas and remote neighborhoods, making a greater number of trips than before. Furthermore, it is expected that the demand for school bus operations will only continue to increase exponentially with time.

Bus entrance door lights function to provide illumination on the outside surface areas adjacent to the vehicle in order to aid the driver in observing boarding passengers, and in order to aid passengers in entry and egress. Bus entrance door lights illuminate when the entrance door is opened and, in some cases, are also designed to include a five second delay timer circuit that provides for the bus entrance door light(s) to remain illuminated for up to five seconds of time once the entrance door is closed. The exterior lamps then turn off automatically once the timer time has elapsed. Buses having entrance door lights may have at least one lamp located by the entrance door, and may also include an additional lamp that is located directly above the driver's side window. The main advantage of the bus entrance door lamps being located by the bus entrance door is to provide perimeter lighting, typically on the right side of the vehicle that aids children in entry and egress especially after dusk or before dawn. The lamp installed above the driver's side window further aids the driver during entry and egress.

Current school bus designs for the U.S.A. and Canada include two or more separate bus entrance door lights. Older versions used halogen lamps. Because of increased consumer demand, five or more LED lamps can easily be installed instead of a single halogen bulb. Due to this technology shift, demand for existing buses in the field and for new buses to include-brighter and more intense entrance door lighting achievable via the LED lamps will only exponentially rise. Factors driving this trend include lack of adequate coverage area with existing designs, increase in population resulting in more bus riders entering and exiting at a given stop, and higher usage of school buses in general transportation, i.e.—serving the needs of the general public besides school children. As a result, customer's orders lead to bus development programs that are aligned to provide newer and brighter lamps, and a greater quantity of lamps, around the bus entrance door, with manufacturers investing resources in positioning newer LED lamps for maximum efficiency.

The bus entrance door lighting illuminates the outside surface areas adjacent to the vehicle when the bus entrance door is opened, and when an ignition power source provided to the lamps is active. Furthermore, other power sources provided to the bus entrance door lights may include the bus door step lights circuit, the red Pupil Warning Lights (PWL) circuit, the clearance or marker lights circuit, and etcetera.

With respect to railroad crossings, regardless of whether there are pupils on-board or not, the majority of United States and Canada laws require school buses to stop prior to entering railroad crossings and to open the bus entrance door, in order to look and listen for approaching trains. Irrespective of how school bus entrance door lamps circuitry is powered, once the bus entrance door opens, the bus entrance door lamps illuminate to their full brightness and may remain illuminated for an additional five seconds after the bus entrance door is closed. Despite the large number of benefits that come with using LED lighting as discussed above of, this also leads to a variety of separate problems, particularly during dusky hours of the day or fully dark conditions.

The first problem is that the sudden illumination of the area directly next to the bus is not conducive to the ability of the driver of the bus to observe oncoming trains. The second problem occurs particularly when the school bus is in the left lane of a multiple lane roadway, for example in the passing lane of a four-lane highway. A bus may stop in the left lane in this way for example due to an immediate left turn a driver needs to make following a railroad crossing. In this circumstance, the sudden illumination of the entrance door lamps may shine directly in the eyes of pedestrians that are on the right-hand sidewalk, or the light may shine directly in the eyes of other drivers, particularly drivers of smaller passenger vehicles passing the bus in the right lane. The sudden illumination of the entrance door lamps may thereby cause inconvenience, annoyance, and distraction of the other drivers. In few cases, where commute time and routes are the same for the commuters and for the bus approaching railroad tracks, radiation of LED lights over certain repetitions may cause permanent damage to the retina of human eye.

The problem is compounded by the growing trend towards using lamps in greater quantity and brighter illumination around the perimeter of the bus entrance door, as discussed previously. Such unresolved and flawed bus entrance door design concerns eventually accelerate. Given advanced LED Lighting technology, foreseeably this trend may result in potential traffic hazards due to the instantaneous appearance of bright and intense illumination in the path of travel of pedestrians and other vehicles. In a worst-case scenario, sustaining and future developments in increased lighting around the bus entrance door could result in triggering temporarily reduced vision, nausea, temporary flash blindness, or startle reflex in pedestrians, other drivers, and passengers including small children riding in smaller size vehicles resulting in fatal accidents, or even negative health impacts for those already suffering with underlying health problems, or detrimental health impacts for those individuals having previous brain injuries.

While there are benefits to increasing illumination surrounding bus entrance doors, there is conversely an unmet need for an arrangement and method for providing such increased illumination when appropriate, such as at bus stops, while preventing the unwanted effects of such illumination occurring when the bus door is opened at railroad crossings.

SUMMARY

According to one embodiment of the method and arrangement, a bus has a pedestrian lighting system including at least one bus entrance door lamp configured to illuminate an area adjacent to an entrance door of the school bus. Bus door entrance lamp circuitry is connected to the bus entrance door lamp(s). Switch logic circuitry is connected to the bus door entrance lamp circuitry. The switch logic circuitry is configured to control operation of the bus door entrance lamp circuitry. A power cutoff noise suppression switch is connected to the switch logic circuitry. The power cutoff noise suppression switch and the switch logic circuitry are configured so that input of the switch logic circuitry to the bus door entrance lamp circuitry is overridden, and the at least one bus entrance door lamp is turned off, when the power cutoff noise suppression switch is activated.

DETAILED DESCRIPTION

Figure 1:
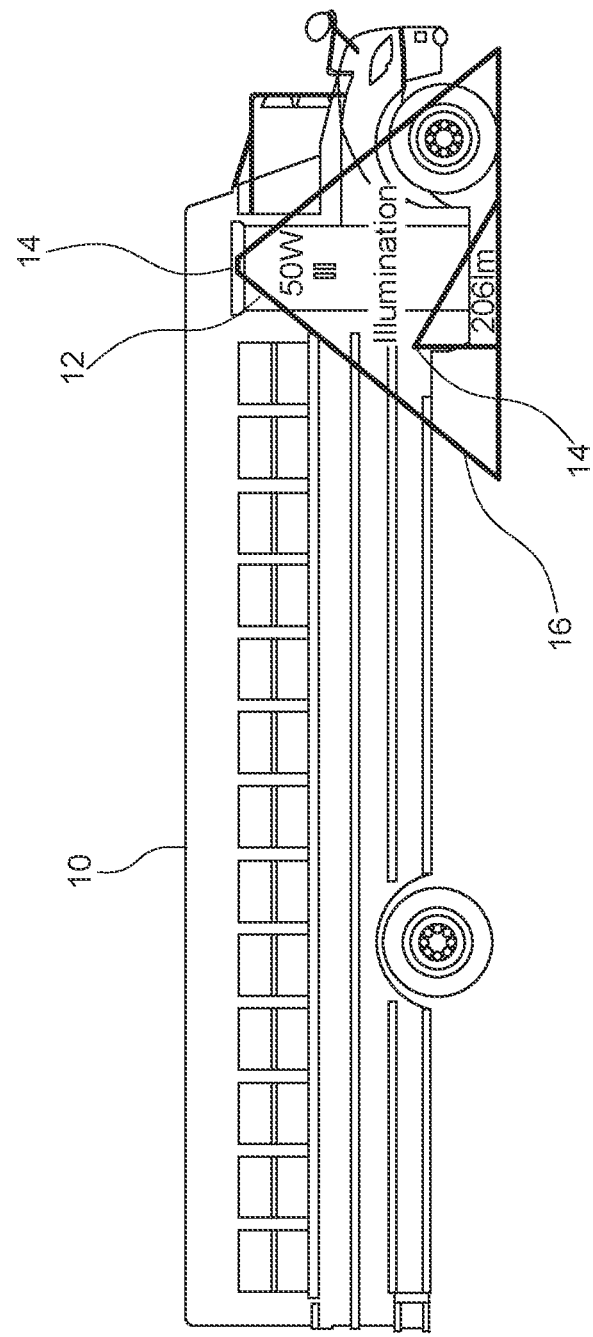
FIG. 1 is an illustration of a school bus having bus entrance door lights, as described herein.

Embodiments described herein relate to a method and arrangement for controlling pedestrian lights that are used to illuminate the immediate area near the entrance door of a school bus. Specifically, embodiments described herein relate to a method and arrangement for controlling the pedestrian lights when the school bus stops at railroad tracks before crossing them. Embodiments of the method and arrangement may include up to five lights located on the right side of the bus plus one lamp located above the driver's side window that would be illuminated at the same time when the school bus makes a stop and the bus entrance door opens.

According to at least one embodiment of the method and arrangement, the bus entrance door lights turn on or illuminate when the bus entrance door is opened, the vehicle ignition is ON, and the parking brake is engaged. The bus entrance door lights turn off when the bus entrance door is closed, the vehicle ignition is ON, and the parking brake is disengaged. In other embodiments of the method and arrangement, an additional five seconds delay may be implemented between the conditions for turning off the bus entrance lights being met, and the method and arrangement causing the bus entrance lights to turn off. In such an embodiment, implementation of the five second delay may be by way of a relay timer component or may be by way of software in a Body Controller Module (BCM). According to at least one such embodiment of the method and arrangement, the bus entrance door lights turn on or illuminate when the bus entrance door is opened, and the vehicle ignition is ON, irrespective of whether the parking brake is engaged. The bus entrance door lights turn off when the bus entrance door is closed, and the vehicle ignition is ON, irrespective of whether the parking brake is disengaged, following the additional five seconds after the bus entrance door is closed.

In each of these embodiments of the method and arrangement, a connection is made between the circuitry of the bus entrance door lights and a noise suppression switch. That is to say that known school bus electrical systems may be provided with a hardwired bi-stable switch located in a switch pack on the bus instrument panel, which allows the bus driver to turn off using the single switch noise generating devices such as the radio, defog fans, roof vent fans, heaters, stepwell heater fan, and any blower fans controlled by the HVAC system. School bus drivers are required by law in some U.S. states and Canadian provinces to use this noise suppression switch when stopping for a railroad crossing. In addition to allowing the bus driver to turn off these noise generating devices by way of a single switch, the noise suppression switch is often positioned for convenient use and is colored in a high contrast color such as black, red, or yellow.

By way of the connection between the circuitry of the bus entrance door lights and the noise suppression switch, in an embodiment of the method and arrangement wherein the bus entrance door lights turn on or illuminate when the bus entrance door is opened, the vehicle ignition is ON, and the parking brake is engaged, the bus entrance door lights turn on or illuminate under these conditions unless the noise suppression switch is activated. If the noise suppression switch is activated, the bus entrance door lights remain off as long as the noise suppression switch remains activated. Otherwise, the bus entrance door lights turn off when the bus entrance door is closed, the vehicle ignition is ON, and the parking brake is disengaged as normal. Similarly, in embodiments of the method and arrangement having a five seconds delay between the conditions for turning of the bus entrance lights being met and the bus entrance lights turning off, activation of the bus entrance lights is overridden by the noise suppression switch. In still further embodiments of the method and arrangement, other conditions for illuminating the bus entrance door lights may include bus door step lights being active, red Pupil Warning Lights (PWL) being active, clearance and/or marker lights being active, and etcetera, provided however that upon activation of the noise suppression switch, all of these inputs are overridden, and the bus entrance door lights remain off.

The normal use of the known noise suppression switch is intuitive to the school bus driver. Normal procedure for a school bus driver approaching a railroad crossing is to activate the noise suppression switch and open the bus entrance door in order to check for oncoming trains. By way of the normal step of activating the noise suppression switch, with respect to the method and arrangement, the driver also deactivates the bus entrance door lights, so that pedestrians or drivers in smaller vehicles can comfortably pass by the school bus without the difficulty or inconvenience of having bright light flash into their eyes. Furthermore, the bus driver's visibility is improved, as he or she is no longer required to look through an illuminated area into a darker area beyond to observe any oncoming train.

The method and arrangement provides a solution that is independent of any specific power source with regards to the bus entrance door lights, so that it can be universally adopted, whether as an Original Equipment Manufacturer (OEM) option, or as an aftermarket kit. The method and arrangement avoids requiring bus drivers to undertake an additional step, such as the activation of a separate switch to inhibit the bus entrance door lights. The method and arrangement can effectively be used at railway crossings by school buses both in the United States and Canada.

Figure 2:
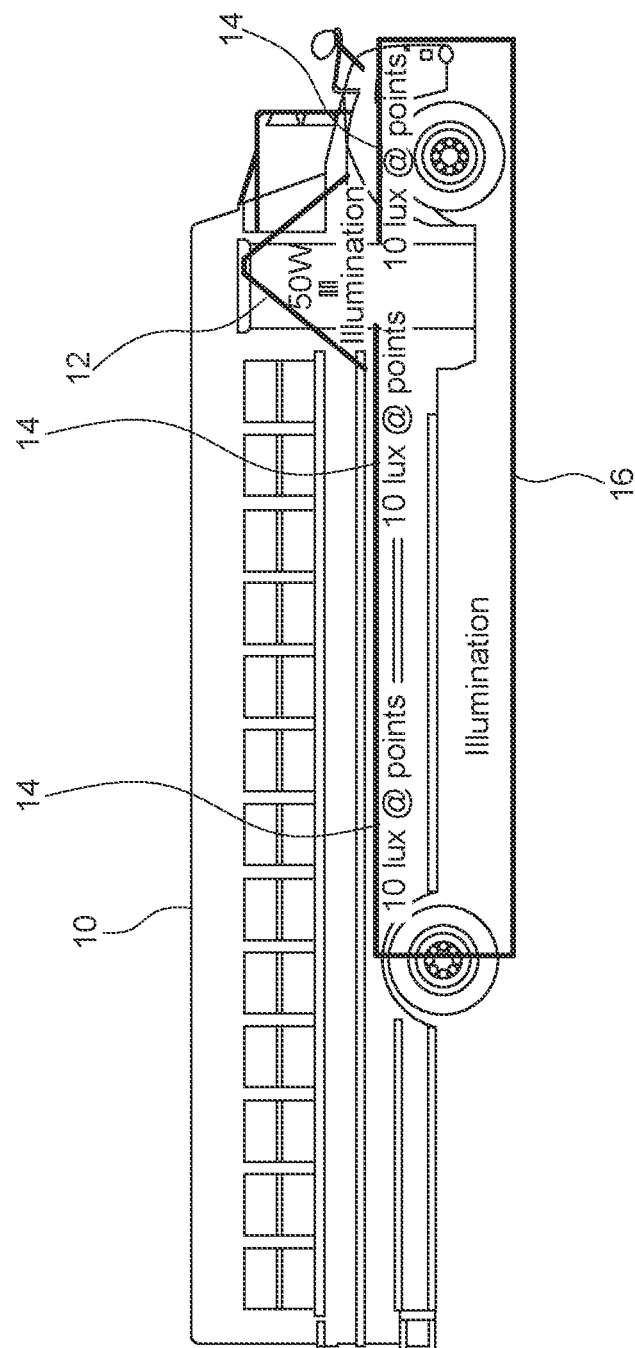
FIG. 2 is an illustration of a school bus having bus entrance door lights, as described herein.
Figure 3:
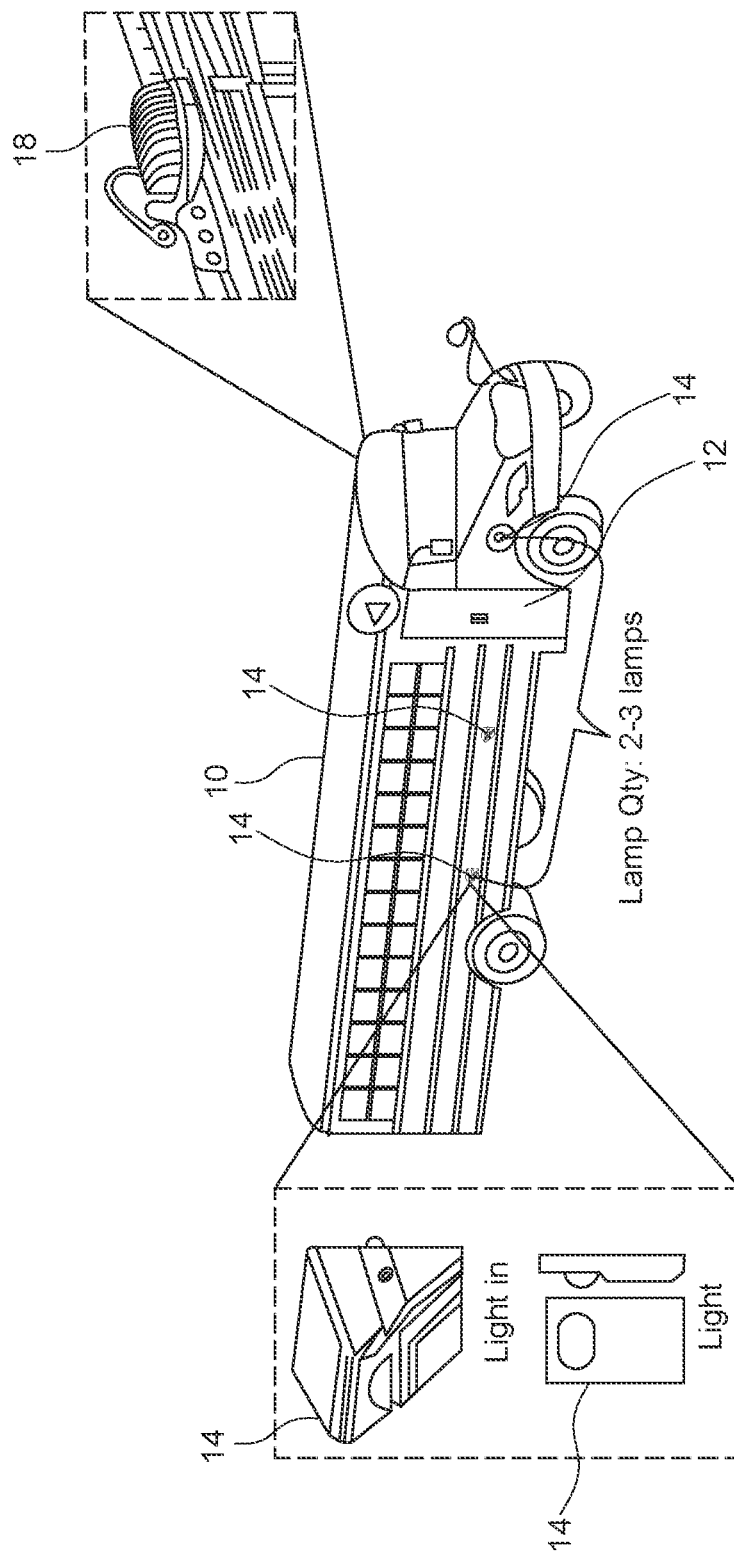
FIG. 3 is an illustration of a school bus having bus entrance door lights, as described herein.

Turning now to FIGS. 1, 2, and 3, school buses 10 are shown provided with bus entrance doors 12. Two or three bus entrance door lights 14 are arranged on each school bus 12 in the vicinity of the bus entrance doors 12, although it is contemplated that as few as one bus entrance door light 14 may be used, and as many as half a dozen or more. Shaded areas in FIGS. 1 and 2 give a rough indication of the illuminated area. Additionally, a single lamp 18 may be provided directly above the driver's side window. For non-limiting example, two 50 watts or 50 watts equivalent white light bulbs may be used, or an upper bus entrance door light may be 50 watts or 50 watts equivalent while a lower lamp may only provide 206 lumens. Varying bus models and designs may implement varying arrangements of bus entrance door lights, including multiple such lights along the side of the vehicle. Such lights along the side of the vehicle may provide, for non-limiting example, 10 lux of illumination per bulb. One or more of the bus entrance door lights 14 may include a hardwired five seconds deactivation timer circuit.

Figure 4:
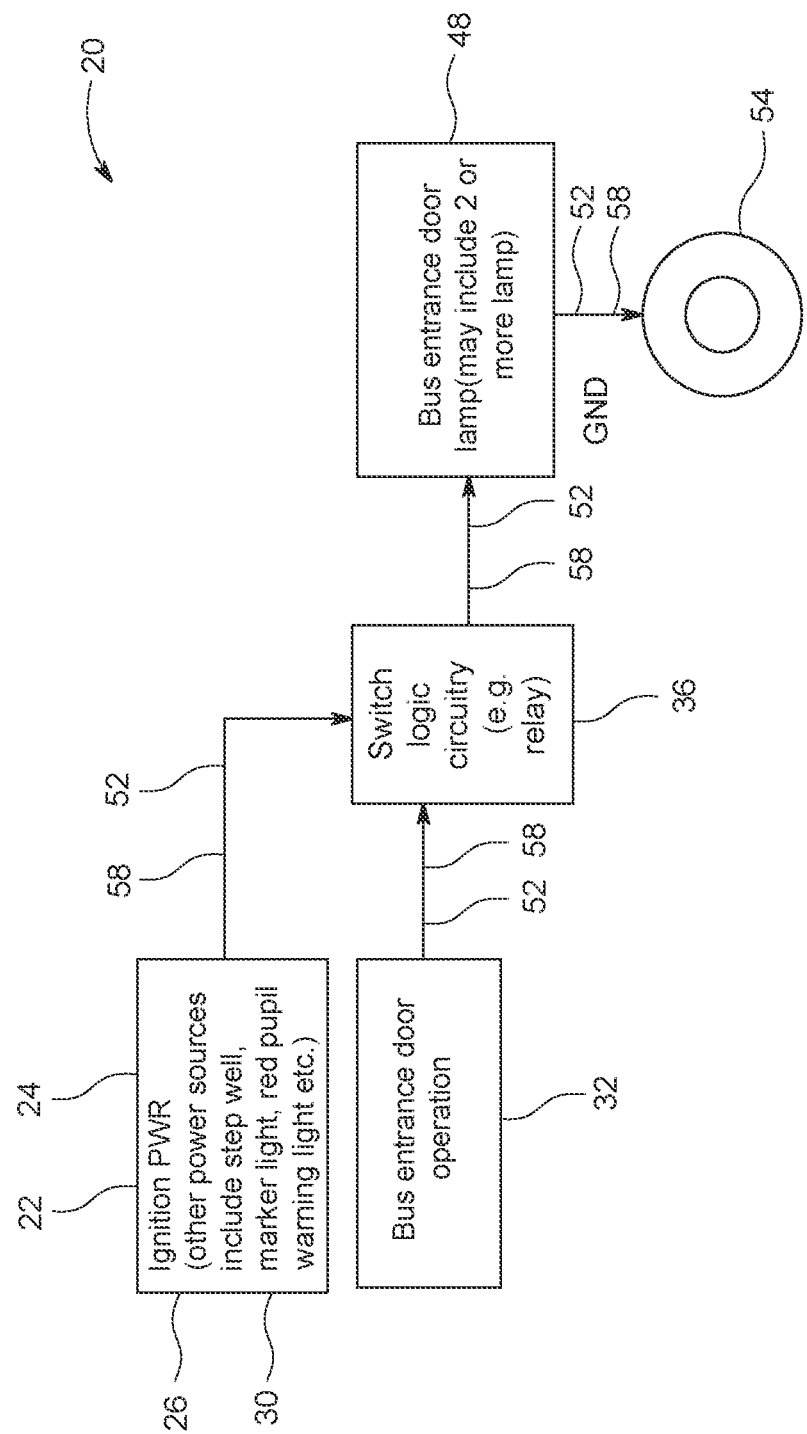
FIG. 4 is a block diagram for a bus entrance door operation that is compatible with the method and arrangement for controlling bus entrance door lights, as described herein.

Turning to FIG. 4, a block diagram for a bus entrance door operation that is compatible with the method and arrangement for controlling bus entrance door lights is shown. An Electrical and Electronics System (EES) 20 includes switch logic circuitry 36 connected to bus entrance door lamp circuitry 48 by way of a physical electrical connection 58 in the form of a harness 52. The switch logic circuitry 36 generally controls operation of the bus entrance door lamp circuitry 48. An ignition circuit 22, bus door step light circuit 24, PWL circuit 26, and/or clearance and/or marker light circuit 30 provides power to the bus entrance door lamps 48 via the switch logic circuitry 36, such as for non-limiting example a relay, by way of physical electrical connection 58 in the form of a harness 52. A bus entrance door operation input 32 is also connected to the switch logic circuitry 36 by way of another physical electrical connection 58 in the form of a harness 52 and serves to indicate to the switch logic circuitry 36 whether the bus entrance door is open or closed. The bus entrance door lamp circuitry 48 is connected to a ground 54 by way of another physical electrical connection 58 in the form of a harness 52.

Figure 5:
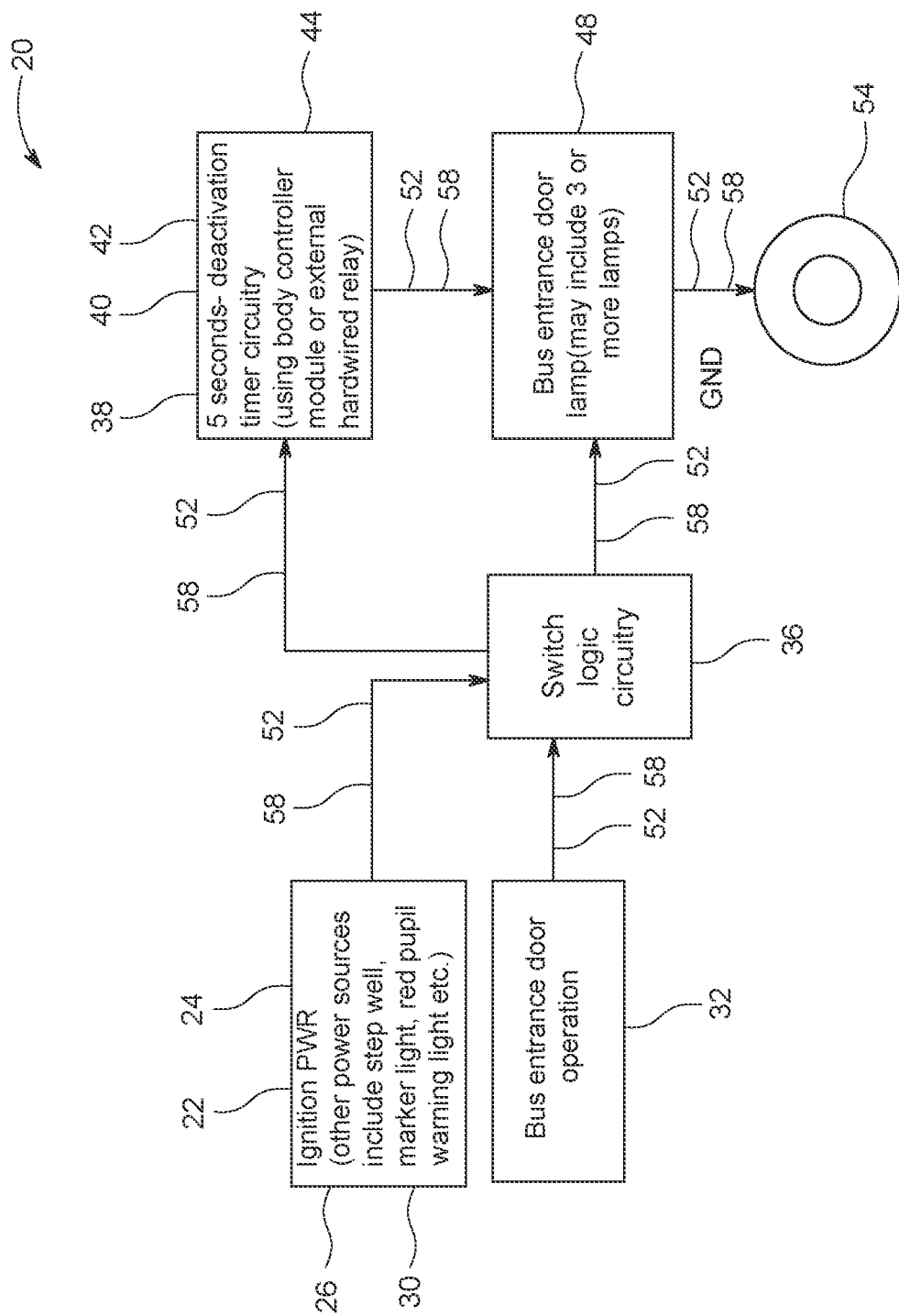
FIG. 5 is another block diagram for a bus entrance door operation that is compatible with the method and arrangement for controlling bus entrance door lights, as described herein.

Turning to FIG. 5, another block diagram for a bus entrance door operation that is compatible with the method and arrangement for controlling bus entrance door lights is shown. An Electrical and Electronics System (EES) 20 again includes switch logic circuitry 36 connected to bus entrance door lamp circuitry 48 by way of a physical electrical connection 58 in the form of a harness 52. The switch logic circuitry 36 generally controls operation of the bus entrance door lamp circuitry 48. An ignition circuit 22, bus door step light circuit 24, PWL circuit 26, and/or clearance and/or marker light circuit 30 again provides power to the bus entrance door lamps 48 via the switch logic circuitry 36, such as for non-limiting example a relay, by way of physical electrical connection 58 in the form of a harness 52. A bus entrance door operation input 32 is again connected to the switch logic circuitry 36 by way of another physical electrical connection 58 in the form of a harness 52 and serves to indicate to the switch logic circuitry 36 whether the bus entrance door is open or closed. Five second deactivation timer circuitry 38, relay timer 40, and/or Body Controller Module (BCM) timer 44 of a BCM 42 (not shown) is also connected to the switch logic circuitry 36 and to the bus entrance door lamp circuitry 48 by way of physical electrical connections 58 in the form of harnesses 52, and serves to keep the bus entrance door lamp circuitry 48 in the ON condition for an additional five seconds, and then turns the bus entrance door lamp circuitry 48 off automatically once the five seconds expires, despite the bus entrance door having been closed. The bus entrance door lamp circuitry 48 is again connected to a ground 54 by way of another physical electrical connection 58 in the form of a harness 52.

Figure 6:
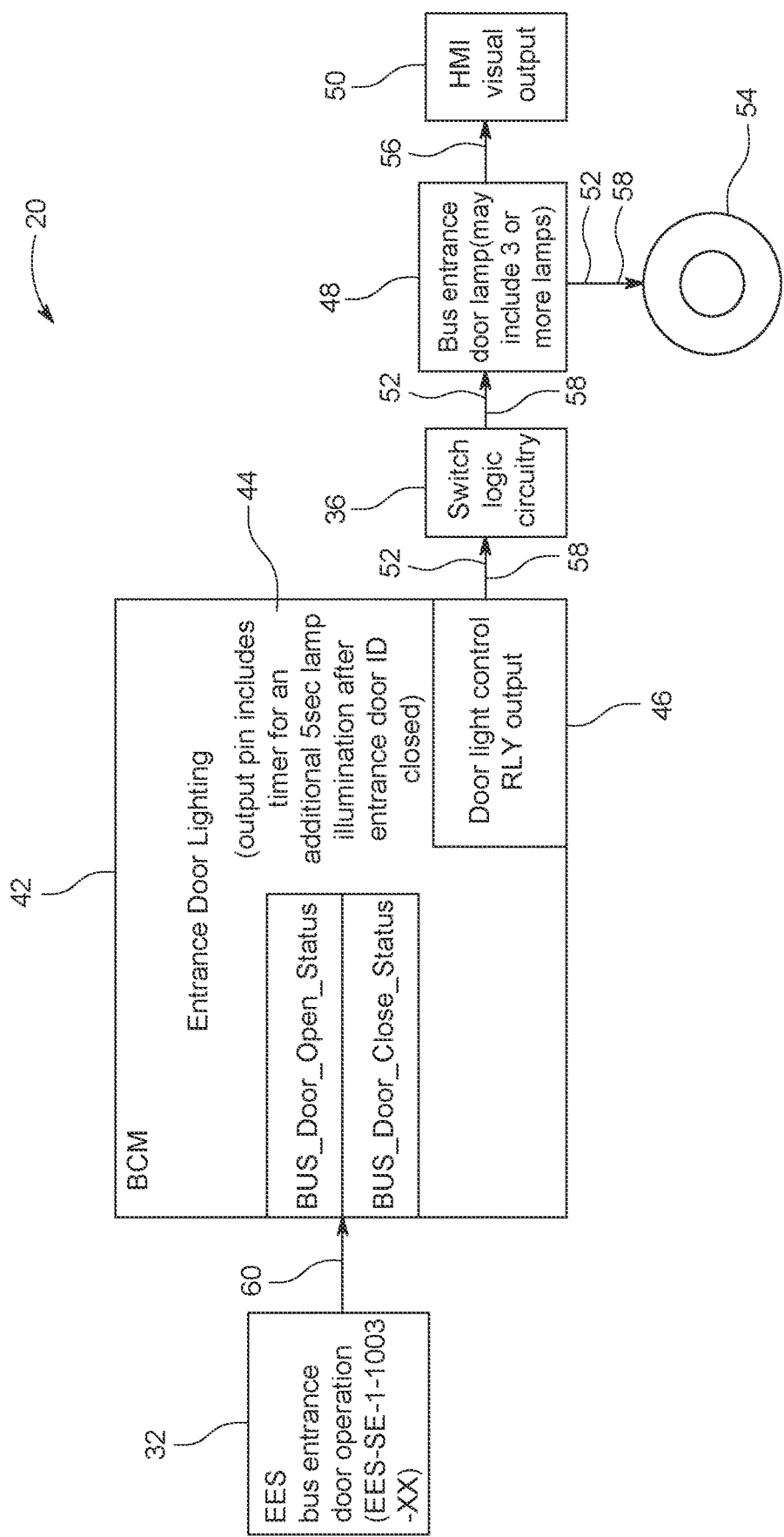
FIG. 6 is another block diagram for a bus entrance door operation that is compatible with the method and arrangement for controlling bus entrance door lights, as described herein.

FIG. 6 is another block diagram for a bus entrance door operation that is compatible with the method and arrangement for controlling bus entrance door lights. An EES 20 again includes switch logic circuitry 36 connected to bus entrance door lamp circuitry 48 by way of a physical electrical connection 58 in the form of a harness 52. A BCM 42 having a door light control relay output 46 is connected directly to the switch logic circuitry 36 by way of a physical electrical connection 58 in the form of a harness 52. The bus entrance door operation input 32, then, is connected directly to the BCM 42 by way of an internal feature status signal 60, so that the BCM 42 directly controls the switch logic circuitry 36 and thereby the bus entrance door lamp circuitry 48 according to the bus entrance door operation input 32. A BCM timer 44 may be integrated into the BCM 42, thereby delaying shutting off the switch logic circuitry 36 following a signal from the bus entrance door operation input 32 that the bus entrance door has been closed. A Human Machine Interface (HMI) visual output 50 is attached to an instrument panel (not shown) and is connected to the bus entrance door lamp circuitry 48 by way of a visual audio feedback connection 56. The bus entrance door lamp circuitry 48 is again connected to a ground 54 by way of another physical electrical connection 58 in the form of a harness 52.

Figure 7:
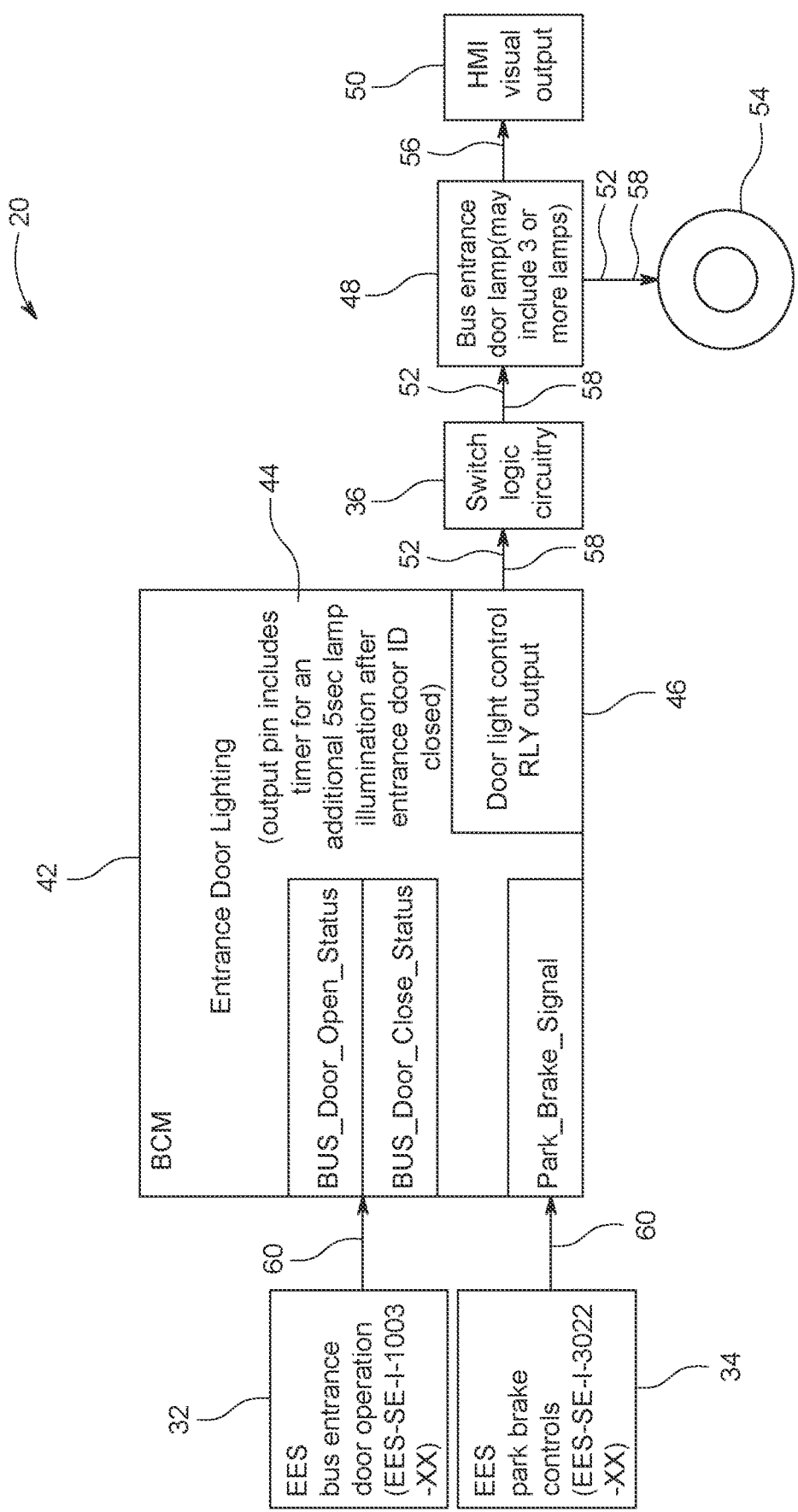
FIG. 7 is another block diagram for a bus entrance door operation that is compatible with the method and arrangement for controlling bus entrance door lights, as described herein.

FIG. 7 is another block diagram for a bus entrance door operation that is compatible with the method and arrangement for controlling bus entrance door lights. An EES 20 again includes switch logic circuitry 36 connected to bus entrance door lamp circuitry 48 by way of a physical electrical connection 58 in the form of a harness 52. A BCM 42 having a door light control relay output 46 is connected directly to the switch logic circuitry 36 by way of a physical electrical connection 58 in the form of a harness 52. The bus entrance door operation input 32, then, is connected directly to the BCM 42 by way of an internal feature status signal 60, so that the BCM 42 directly controls the switch logic circuitry 36 and thereby the bus entrance door lamp circuitry 48 according to the bus entrance door operation input 32. Similarly, a park brake controls input 34 is also connected directly to the BCM 42 by way of an internal feature status signal 60, so that the BCM 42 directly controls the switch logic circuitry 36 and thereby the bus entrance door lamp circuitry 48 according to the park brake controls input 34. A BCM timer 44 may be integrated into the BCM 42, thereby delaying shutting off the switch logic circuitry 36 following a signal from the bus entrance door operation input 32 that the bus entrance door has been closed. A Human Machine Interface (HMI) visual output 50 is attached to an instrument panel (not shown) and is connected to the bus entrance door lamp circuitry 48 by way of a visual audio feedback connection 56. The bus entrance door lamp circuitry 48 is again connected to a ground 54 by way of another physical electrical connection 58 in the form of a harness 52.

Figure 8:
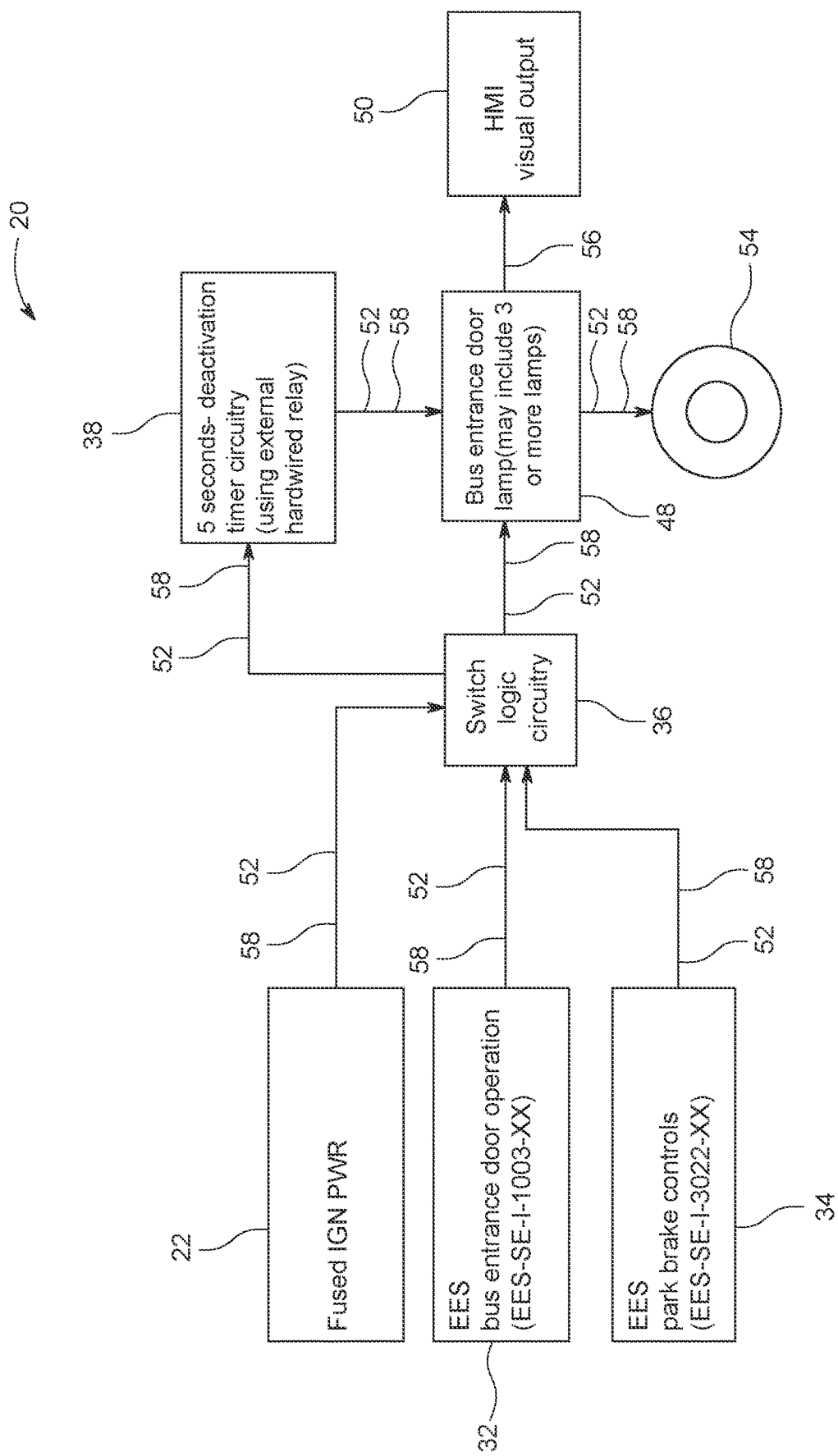
FIG. 8 is another block diagram for a bus entrance door operation that is compatible with the method and arrangement for controlling bus entrance door lights, as described herein.

FIG. 8 is yet another block diagram for a bus entrance door operation that is compatible with the method and arrangement for controlling bus entrance door lights. An EES 20 again includes switch logic circuitry 36 connected to bus entrance door lamp circuitry 48 by way of a physical electrical connection 58 in the form of a harness 52. An ignition circuit 22 and a bus entrance door operation input 32 are both connected to the switch logic circuitry 36 by way of physical electrical connections 58 in the form of harnesses 52. Further, a park brake controls input 34 is also connected to the switch logic circuitry 36 by way of a physical electrical connection 58 in the form of a harness 52. In this way, the switch logic circuitry 36 controls the operation of the bus entrance door lamp circuitry 48 according to the status of the ignition circuit 22, bus entrance door operation input 32, and park brake controls input 34. A five second deactivation timer circuitry 38 is also connected to the switch logic circuitry 36 and to the bus entrance door lamp circuitry 48 by way of physical electrical connections 58 in the form of harnesses 52 and serves to keep the bus entrance door lamp circuitry 48 in the ON condition for five seconds despite the bus entrance door having been closed. An HMI visual output 50 is attached to an instrument panel (not shown) and is connected to the bus entrance door lamp circuitry 48 by way of a visual audio feedback connection 56. The bus entrance door lamp circuitry 48 is connected to a ground 54 by way of another physical electrical connection 58 in the form of a harness 52.

Figure 9:
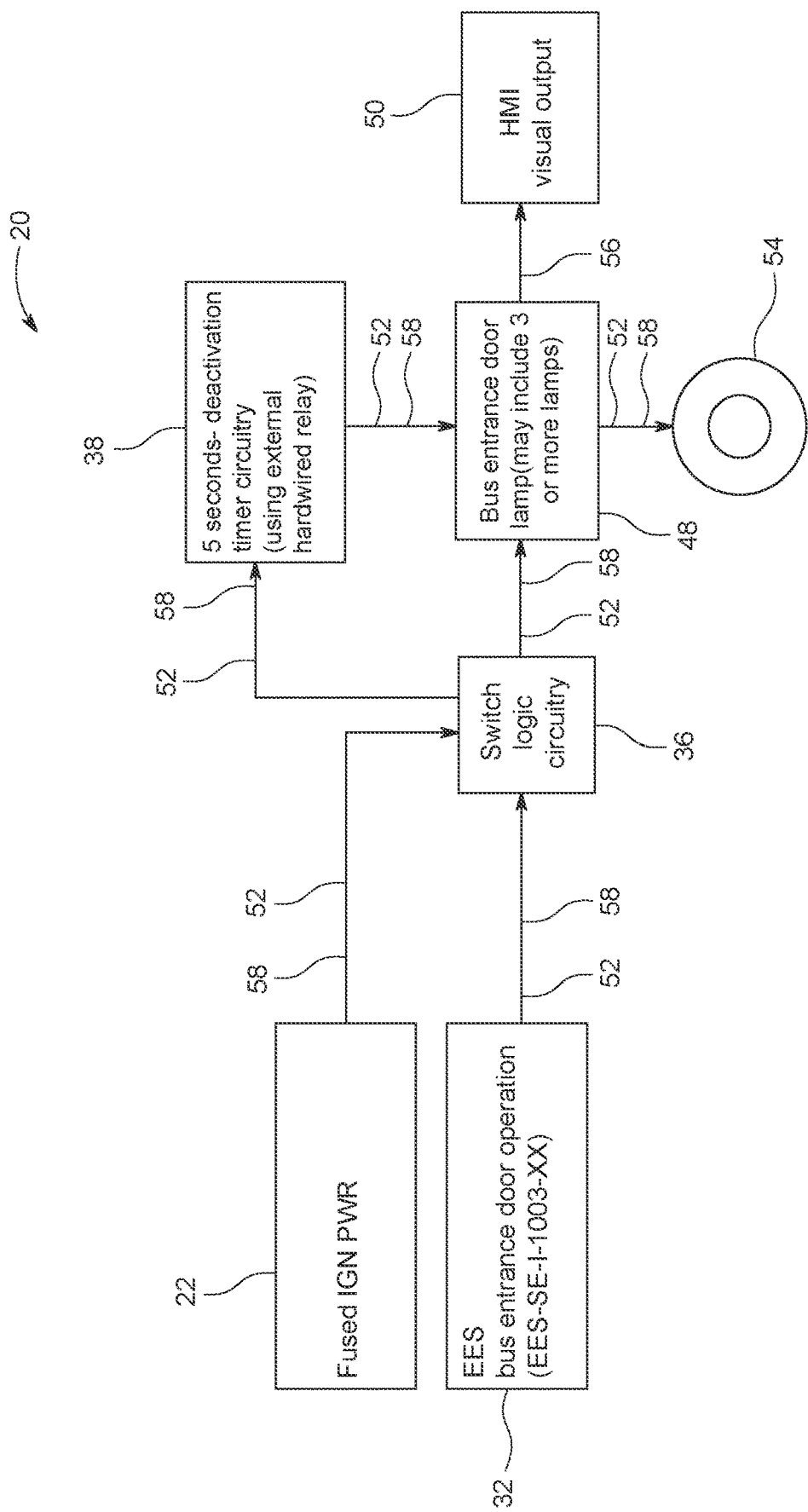
FIG. 9 is another block diagram for a bus entrance door operation that is compatible with the method and arrangement for controlling bus entrance door lights, as described herein.

FIG. 9 is yet another block diagram for a bus entrance door operation that is compatible with the method and arrangement for controlling bus entrance door lights and is similar to the block diagram of FIG. 6. An EES 20 again includes switch logic circuitry 36 connected to bus entrance door lamp circuitry 48 by way of a physical electrical connection 58 in the form of a harness 52. An ignition circuit 22 and a bus entrance door operation input 32 are both connected to the switch logic circuitry 36 by way of physical electrical connections 58 in the form of harnesses 52. However, no park brake controls input 34 is connected to the switch logic circuitry 36. In this way, the switch logic circuitry 36 controls the operation of the bus entrance door lamp circuitry 48 according to the status of the ignition circuit 22 and the bus entrance door operation input 32. A five second deactivation timer circuitry 38 is again connected to the switch logic circuitry 36 and to the bus entrance door lamp circuitry 48 by way of physical electrical connections 58 in the form of harnesses 52, and serves to keep the bus entrance door lamp circuitry 48 in the ON condition for five seconds despite the bus entrance door having been closed. An HMI visual output 50 is attached to an instrument panel (not shown) and is connected to the bus entrance door lamp circuitry 48 by way of a visual audio feedback connection 56. The bus entrance door lamp circuitry 48 is connected to a ground 54 by way of another physical electrical connection 58 in the form of a harness 52.

Figure 10:
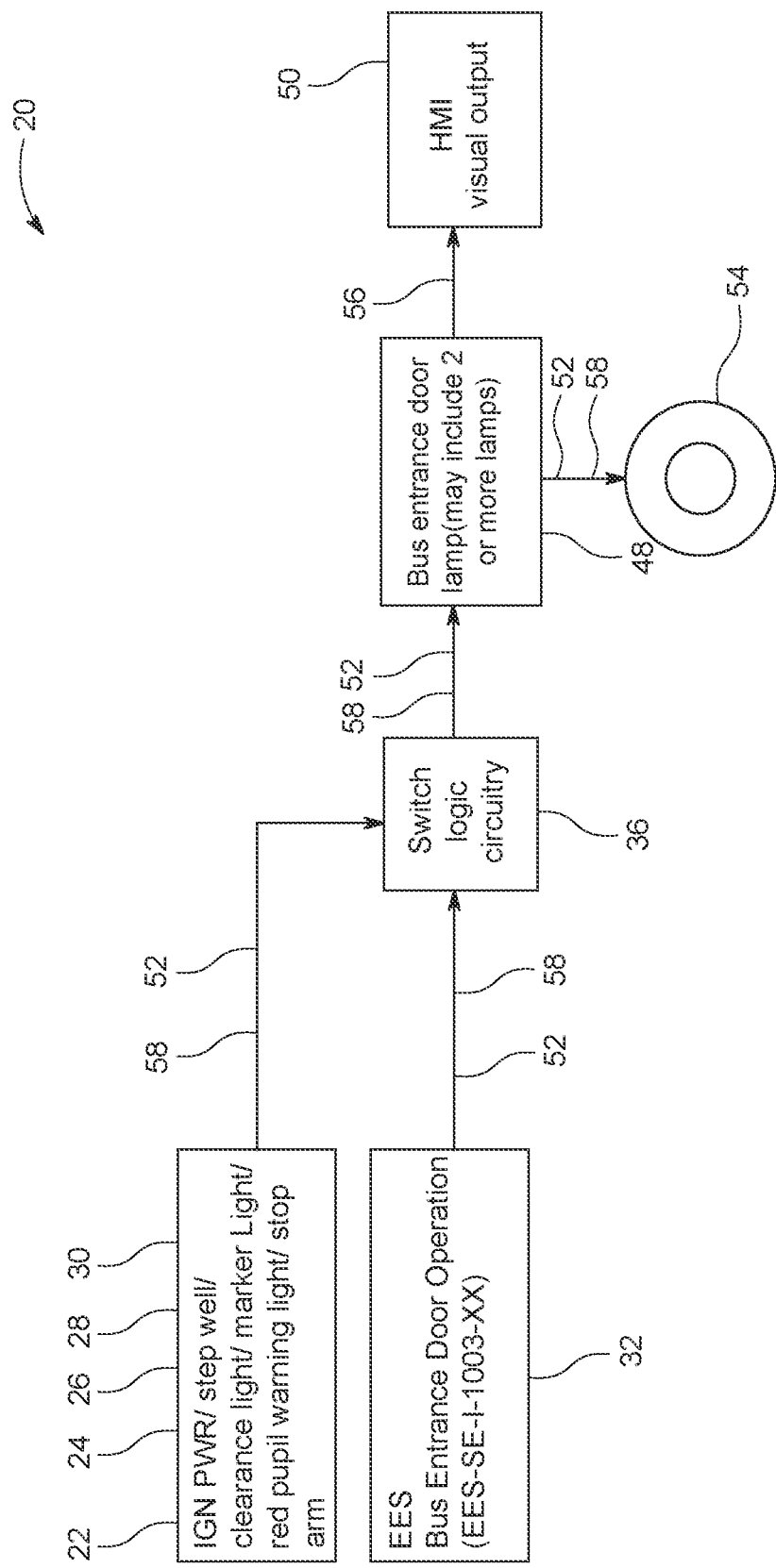
FIG. 10 is another block diagram for a bus entrance door operation that is compatible with the method and arrangement for controlling bus entrance door lights, as described herein.

FIG. 10 is another block diagram for a bus entrance door operation that is compatible with the method and arrangement for controlling bus entrance door lights. An EES 20 again includes switch logic circuitry 36 connected to bus entrance door lamp circuitry 48 by way of a physical electrical connection 58 in the form of a harness 52. The switch logic circuitry 36 generally controls operation of the bus entrance door lamp circuitry 48. An ignition circuit 22, bus door step light circuit 24, PWL circuit 26, stop arm circuit 28, and/or clearance and/or marker light circuit 30 provides power to the switch logic circuitry 36 by way of another physical electrical connection 58 in the form of a harness 52. A bus entrance door operation input 32 is also connected to the switch logic circuitry 36 by way of another physical electrical connection 58 in the form of a harness 52, and serves to indicate to the switch logic circuitry 36 whether the bus entrance door is open or closed. An HMI visual output 50 is attached to an instrument panel (not shown) and is connected to the bus entrance door lamp circuitry 48 by way of a visual audio feedback connection 56. The bus entrance door lamp circuitry 48 is connected to a ground 54 by way of another physical electrical connection 58 in the form of a harness 52.

Figure 11:
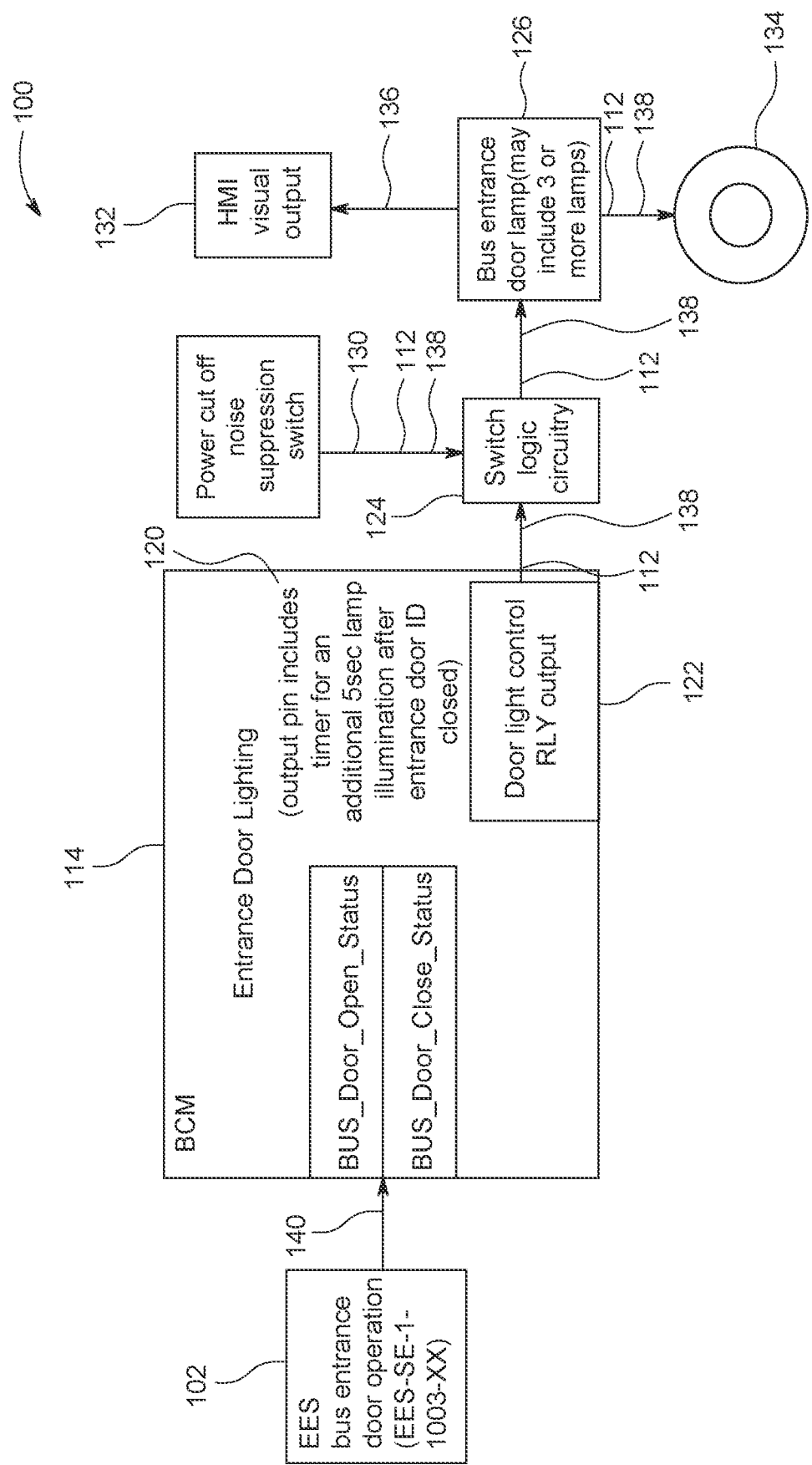
FIG. 11 is a block diagram of a bus entrance door operation having an embodiment of the method and arrangement for controlling bus entrance door lights, as described herein.

Turning now to FIG. 11, a block diagram for a bus entrance door operation having an embodiment of the method and arrangement for controlling bus entrance door lights is shown. An EES 100 again includes switch logic circuitry 124 connected to bus entrance door lamp circuitry 126 by way of a physical electrical connection 138 in the form of a harness 112. A BCM 114 having a door light control relay output 122 is connected directly to the bus entrance door lamp circuitry 126 by way of a physical electrical connection 138 in the form of a harness 112. The bus entrance door operation input 102, then, is connected directly to the BCM 114 by way of an internal feature status signal 140, so that the BCM 114 directly controls the switch logic circuitry 124 and thereby the bus entrance door lamp circuitry 126 according to the bus entrance door operation input 102. A BCM timer 120 may be integrated into the BCM 114, thereby delaying shutting off the switch logic circuitry 124 following a signal from the bus entrance door operation input 102 that the bus entrance door has been closed. An HMI visual output 132 is attached to an instrument panel (not shown) and is connected to the bus entrance door lamp circuitry 126 by way of a visual audio feedback connection 136. The bus entrance door lamp circuitry 126 is again connected to a ground 134 by way of another physical electrical connection 138 in the form of a harness 112.

In the embodiment of the method and arrangement for controlling bus entrance door lights shown in FIG. 11, a power cutoff noise suppression switch 128 is also connected to the switch logic circuitry 124 by way of a splice connection wire 130, which in the embodiment is another physical electrical connection 138 in the form of a harness 112. The power cutoff noise suppression switch 128 and the switch logic circuitry 124 are configured so that activation of the power cutoff noise suppression switch 128 shuts off the bus entrance door lamp circuitry 126, along with performing the other functions of the power cutoff noise suppression switch 128, i.e.—turning off noise generating devices such as the radio, defog fans, roof vent fans, heaters, stepwell heater fan, and any blower fans controlled by the HVAC system. It is noted that the power cutoff noise suppression switch 128 and the switch logic circuitry 124 are configured so that the input of the BCM 114 and/or door light control relay output 122 is overridden when the power cutoff noise suppression switch 128 is activated.

Figure 12:
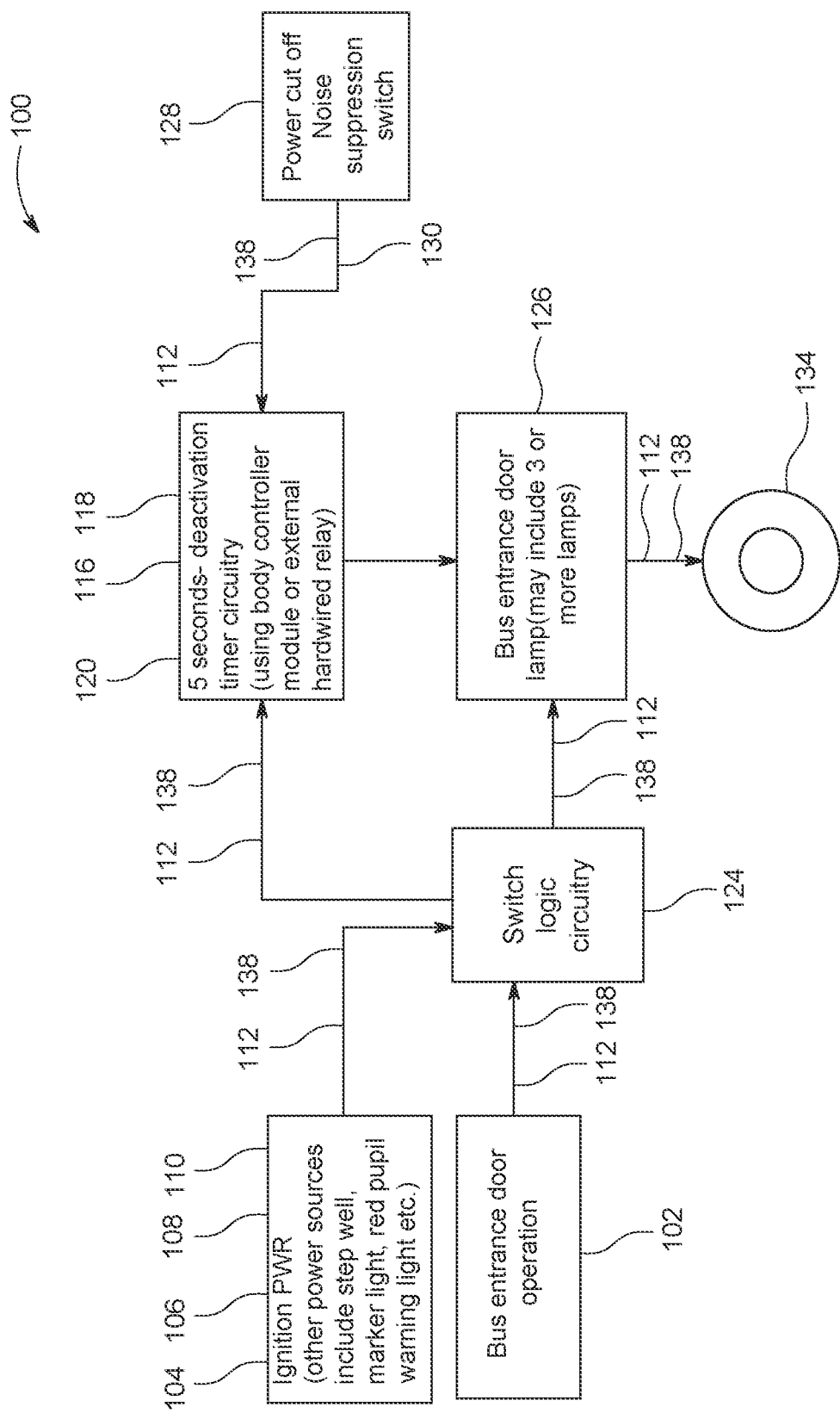
FIG. 12 is another block diagram of a bus entrance door operation having an embodiment of the method and arrangement for controlling bus entrance door lights, as described herein.

Turning to FIG. 12, another block diagram for a bus entrance door operation having an embodiment of the method and arrangement for controlling bus entrance door lights is shown. An EES 100 includes switch logic circuitry 124 connected to bus entrance door lamp circuitry 126 by way of a physical electrical connection 138 in the form of a harness 112. The switch logic circuitry 124 generally controls operation of the bus entrance door lamp circuitry 126. An ignition circuit 104, bus door step light circuit 106, PWL circuit 108, and/or clearance and/or marker light circuit 110 provides power to the switch logic circuitry 124 by way of another physical electrical connection 138 in the form of a harness 112. A bus entrance door operation input 102 is also connected to the switch logic circuitry 124 by way of another physical electrical connection 138 in the form of a harness 112, and serves to indicate to the switch logic circuitry 124 whether the bus entrance door is open or closed. A five second deactivation timer circuitry 116, relay timer 118, and/or BCM timer 120 of a BCM 114 (not shown) is also connected to the switch logic circuitry 124 and to the bus entrance door lamp circuitry 126 by way of physical electrical connections 138 in the form of harnesses 112, and serves to keep the bus entrance door lamp circuitry 126 in the ON condition for five seconds despite the bus entrance door having been closed. The bus entrance door lamp circuitry 126 is connected to a ground 134 by way of another physical electrical connection 138 in the form of a harness 112.

In the embodiment of the method and arrangement for controlling bus entrance door lights shown in FIG. 12, a power cutoff noise suppression switch 128 is connected to the five second deactivation timer circuitry 116, relay timer 118, and/or BCM timer 120 by way of a splice connection wire 130, which in the embodiment is another physical electrical connection 138 in the form of a harness 112. The power cutoff noise suppression switch 128 and the five second deactivation timer circuitry 116, relay timer 118, and/or BCM timer 120 are configured so that activation of the power cutoff noise suppression switch 128 shuts off the bus entrance door lamp circuitry 126, along with performing the other functions of the power cutoff noise suppression switch 128, i.e.—turning off noise generating devices such as the radio, defog fans, roof vent fans, heaters, stepwell heater fan, and any blower fans controlled by the HVAC system. It is noted that the power cutoff noise suppression switch 128 and the five second deactivation timer circuitry 116, relay timer 118, and/or BCM timer 120 are configured so that the input of the switch logic circuitry 124 is overridden when the power cutoff noise suppression switch 128 is activated.

It is emphasized that the embodiments of the method and arrangement for controlling bus entrance door lights shown in FIGS. 11 and 12 are exemplary. Specifically, it is contemplated that the power cutoff noise suppression switch of the method and arrangement may be similarly connected to the switch logic circuitries and/or to the five second deactivation timer circuitry, relay timer, and/or BCM timers of any of FIGS. 4 through 10. In each contemplated embodiment, therefore, the power cutoff noise suppression switch and the switch logic circuitries and/or the five second deactivation timer circuitry, relay timer, and/or BCM timers are again configured so that activation of the power cutoff noise suppression switch shuts off the bus entrance door lamp circuitry, along with performing the other functions of the power cutoff noise suppression switch, i.e.—turning off noise generating devices such as the radio, defog fans, roof vent fans, heaters, stepwell heater fan, and any blower fans controlled by the HVAC system.

While the method and arrangement of Pedestrian Bus Lights "Off" when Entrance Door Opens at Railway Tracks has been described with respect to at least one embodiment, the method and arrangement of Pedestrian Bus Lights "Off" when Entrance Door Opens at Railway Tracks can be further modified within the spirit and scope of this disclosure, as demonstrated previously. This application is therefore intended to cover any variations, uses, or adaptations of the method and arrangement of Pedestrian Bus Lights "Off" when Entrance Door Opens at Railway Tracks using its general principles. Further, this application is intended to cover such departures from the disclosure as come within known or customary practice in the art to which the disclosure pertains and which fall within the limits of the appended claims.

What is claimed is:

1. A pedestrian lighting system of a school bus, comprising:
    at least one bus entrance door lamp configured to illuminate an area adjacent to an entrance door of the school bus;
    bus door entrance lamp circuitry connected to the at least one bus entrance door lamp;
    at least one of switch logic circuitry and delayed deactivation timer circuitry connected to the bus door entrance lamp circuitry, at least one of the switch logic circuitry and delayed deactivation timer circuitry being configured to control operation of the bus door entrance lamp circuitry; and
    a power cutoff noise suppression switch connected to at least one of the switch logic circuitry and the delayed deactivation timer circuitry, the power cutoff noise suppression switch and at least one of the switch logic circuitry and the delayed deactivation timer circuitry being configured so that input of the switch logic circuitry to the bus door entrance lamp circuitry is overridden, and the at least one bus entrance door lamp is turned off, when the power cutoff noise suppression switch is activated, the power cutoff noise suppression switch further functions to turn off at least one noise generating devices when activated, the switch logic circuitry being configured to turn on the at least one bus entrance door lamp when a vehicle ignition circuit is on and the entrance door is opened; and the switch logic circuitry being configured to turn off the at least one bus entrance door lamp when the entrance door is closed, the switch logic circuitry being further configured to turn on the at least one bus entrance door lamp when the vehicle ignition circuit is on, the entrance door is opened, and a parking brake is engaged, and the switch logic circuitry being further configured to turn off the at least one bus entrance door lamp when the entrance door is closed and the parking brake is disengaged.

2. The pedestrian lighting system of claim 1, wherein:
the delayed deactivation timer circuitry being configured to delay turning off the at least one bus entrance door lamp when the entrance door is closed.

3. The pedestrian lighting system of claim 1, further comprising:
   a Body Controller Module (BCM) connected to the switch logic circuitry;
   the BCM and the switch logic circuitry being configured to turn on the at least one bus entrance door lamp when a vehicle ignition circuit is on and the entrance door is opened; and
   the BCM and the switch logic circuitry being configured to turn off the at least one bus entrance door lamp when the entrance door is closed.

4. The pedestrian lighting system of claim 3, wherein:
the BCM having a delay timer configured to delay turning off the at least one bus entrance door lamp when the entrance door is closed.

\* \* \* \* \*